United States Patent [19]

Lindner

[11] Patent Number: 4,658,321
[45] Date of Patent: Apr. 14, 1987

[54] THERMAL OVERLOAD PROTECTION APPARATUS FOR A COMMUTATOR OR SLIPRING MOTOR

[75] Inventor: Adolf Lindner, Rottendorf, Fed. Rep. of Germany

[73] Assignee: Siemens Aktiengesellschaft, Berlin and Munich, Fed. Rep. of Germany

[21] Appl. No.: 764,853

[22] Filed: Aug. 12, 1985

[30] Foreign Application Priority Data

Aug. 13, 1984 [DE] Fed. Rep. of Germany ............... 84109642[U]

[51] Int. Cl.⁴ .............................. H02H 5/04
[52] U.S. Cl. ..................... 361/25; 318/471; 337/140; 310/68 C; 310/238; 310/249
[58] Field of Search ............... 361/25–27; 307/116, 117; 318/471–473, 244, 245, 451; 337/140; 310/68 C, 248, 239

[56] References Cited

U.S. PATENT DOCUMENTS

| | | | |
|---|---|---|---|
| 3,872,415 | 3/1975 | Clarke | 337/140 |
| 4,034,265 | 7/1977 | DuRocher et al. | 361/25 |
| 4,499,517 | 2/1985 | Lisauskas | 310/68 C |
| 4,564,775 | 1/1986 | Mazzorana | 310/63 |

FOREIGN PATENT DOCUMENTS 3306663  2/1984  Fed. Rep. of Germany .

OTHER PUBLICATIONS

German Publication Material and Technik, No. 2, 1978, article "Mechanismus und Anwendungen des Formgedaechtniseffektes", by K. N. Melton and O. Mercier (translation not available).

Primary Examiner—G. P. Tolin
Assistant Examiner—Jeffrey A. Gaffin
Attorney, Agent, or Firm—Volker R. Ulbrich

[57] ABSTRACT

A thermally released switching mechanism which in a simple fashion and at a precisely defined switching point clearly interrupts the current to the motor when a preset, highest admissible temperature is exceeded, at least until the actual temperature has once against fallen below the highest admissible temperature. The thermally released switching mechanism is comprised of a lever element made of a memory element which, upon exceeding the highest permissible temperature set value, lifts the brush from a commutator or a slipring. This mechanism preferrably employs a memory element with a two-way effect. This thermal switching mechanism is suitable both for commutator motors with hammer or tubular brush holder systems as well as for slipring motors.

15 Claims, 4 Drawing Figures

U.S. Patent
Apr. 14, 1987
4,658,321
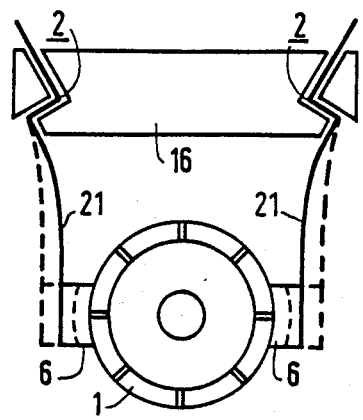
FIG 1
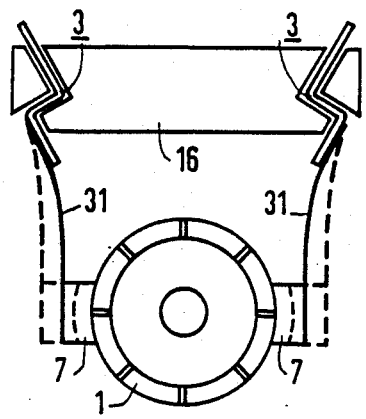
FIG 2
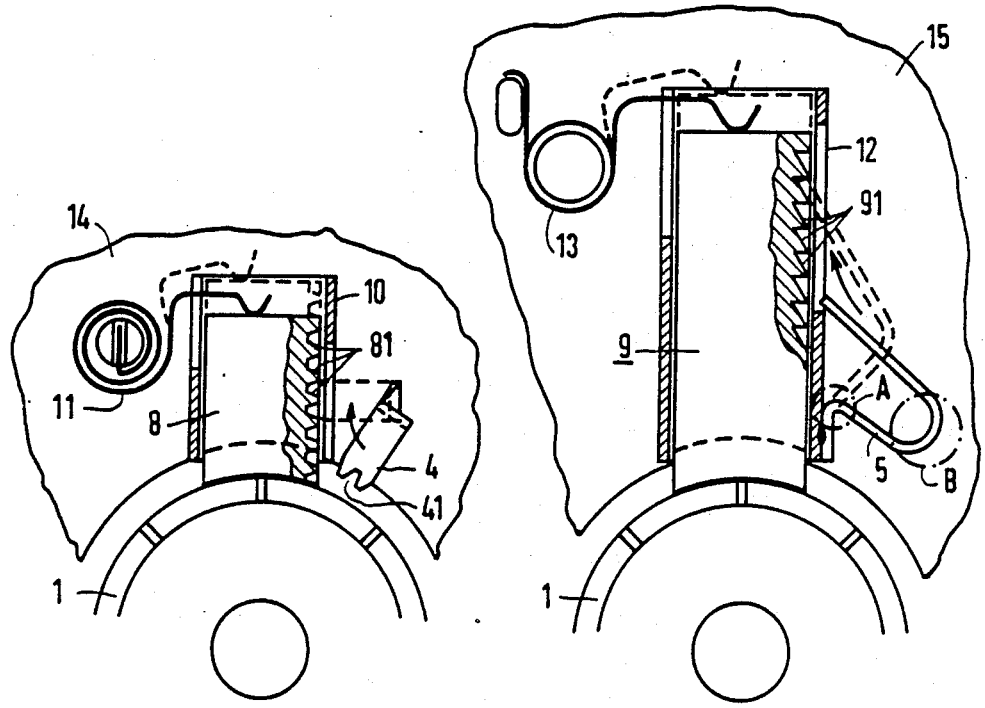
FIG 3
FIG 4

THERMAL OVERLOAD PROTECTION APPARATUS FOR A COMMUTATOR OR SLIPRING MOTOR

BACKGROUND OF THE INVENTION

This invention relates to a thermal overload protection apparatus for either a commutator or slipring motor.

One type of thermal overload protection is known from German published application No. 3,306,663 by Volkmar Koenig, published Feb. 2, 1984. In this known device used specifically to monitor the temperature of a hammer brush holder of an electrical motor, there is a thermal switch with a bimetallic or semiconductor element inserted in a side pocket-shaped seat of the brush mounting arm of a hammer brush holder, by which, in the event of excessive temperature rise and consequent exceeding of a specified temperature, a switch interrupts the electrical power supplied to the brush and thereby switches off the motor. It is desirable to provide a mechanism for thermal overload protection without the increase in cost and the decrease in reliability of having a thermally actuated electrical switch in series with the brushes.

The mechanism and application of the so-called form memory effect are known from existing applications (e.g., the journal "Material und Technik", 1978, No. 2, p. 59–65). Memory alloys are materials which after plastic deformation at low temperatures resume their original shape when heated above a critical temperature ("memory effect"). Memory elements having both a so-called one-way effect as well as those with a so-called "two-way effect" are described in detail. With the one-way effect, the original shape is resumed only once when being heated, while with the two-way effect there is a reversible temperature-dependent form change behavior, wherein during the heating process the distortion is not reversed entirely and following subsequent cooling a form change toward the original distortion is attained. Both the one-way as well as the two-way effect can each be repeated as often as desirable.

By designing a brush holder in accordance with this invention it is possible to lift the brushes themselves, without additional power assistance means, from the surface of the commutator or the slipring suddenly and with great force and thereby to assure an interruption of the power circuit or switch off of the motor which is to be protected from excessive heatup. The expense for said overload protection can be further reduced for a hammer brush holder system of a commutator or a slipring motor by providing a memory element with a two-way effect. Special design, fabrication as well as manufacturing expense for additional bimetallic or semiconductor temperature switches and their mechanical mountings and electrical connections are thereby eliminated.

The object of this invention is to develop an overload protection which in contrast to the known device for temperature monitoring previously described, is easier to manufacture and install. A second object of this invention is to provide high operating reliability by maintaining a defined switch-off point when attaining or exceeding a preset temperature set value of the overload protection. A further object of this invention is to use the memory effect of certain alloys in the manufacture of cost effective, reliable thermal overload protection apparatus.

SUMMARY OF THE INVENTION

A thermal overload protection apparatus for brush electric motors, either of the commutator type contacts or of the slipring type contacts, is provided having a thermally actuated switching mechanism. A lever element, which is manufactured with a memory element, lifts one of the brushes from the rotating electrical contacts interrupting the power supplied, when the temperature of the memory element exceeds the set-value overload temperature.

In order to restrict as far as possible the required special alloy necessary for the switching elements, a further embodiment of the invention specifies that the lever element form a separate part of the brush support arm, whereby in the most practical fashion the lever element itself made of a memory element only forms the first part of the brush support arm, which is fixed-mounted in the brush support plate, while the remaining part of the brush support arm consists of an elastic spring element separately mounted to the first part, which presses against the surface of the commutator or the slipring via the brush mounted at its free end.

For the fabrication and manufacturing application of the model in accordance with the invention in an electrical motor with a tubular brush holder system with brushes aligned in the tubes largely radially to the commutator and pressed by a spring against its surface, one application of this invention fastens the lever element at one end to the exterior wall of the tube and has its other end bent directly or indirectly toward the brush in such a fashion that when exceeding the temperature set value, the free end moving contrary to the action of the spring is connected in either a directly contacting or a gear meshing fashion to the brush, thereby lifting it from the surface of the commutator. Two special embodiments of the application of the invention for a tubular brush holder system are further characterized by having the lever element connected to the brush in a lifting action from the surface of the commutator by either a torsional-swivel deflector or by a stretch-bend deflector.

BRIEF DESCRIPTION OF THE DRAWINGS

While the specificaton concludes with claims particularly pointing out and distinctly claiming the subject matter which is regarded as the invention, it is believed that the invention will be better understood from the following description of the four depicted embodiments taken in conjunction with the accompanying drawings in which:

FIG. 1 is an axial plan view on a first hammer brush holder system with one-piece brush support arms;

FIG. 2 is an axial plan view of a second hammer brush holder system with sectional brush support arms;

FIG. 3 is an axial plan view of a first tubular brush holder system with a torsional-swivel deflector lever element lifting the brushes;

FIG. 4 is an axial plan view of a second tubular brush holder system with a stretch-bend deflector lever element lifting the brushes.

DESCRIPTION OF THE PREFERRED EMBODIMENT

FIG. 1 shows two one-piece brush support arms of a hammer brush holder system fixed-mounted to a schematically depicted brush support plate 16. The single-piece brush support arms made of a memory element having a two-way memory effect are shaped in the upper portion as the actual lever element 2 (memory element) and in their remaining portion as the spring-action element 21, in such a fashion that in normal operating condition the brushes 6 fastened to the lower free ends of the brush support arms are pressed against the surface of the commutator 1. The lever elements 2 made of a memory element with a two-way effect are designed so that when attaining or exceeding the temperature set value, for example a fixed temperature of 160 degrees Centigrade, a relatively expansive and temperature-independent lever action transpires practically instantaneously within a temperature range of 10 to 15 degrees Centigrade, whereby due to the large action capability of a lever elememt, the brushes 6 are moved into the position shown by the broken line and thereby lifted instantaneously from the surface of the commutator so that the power supplied to the commutator is interrupted. The brushes 6 remain in their lifted position until the temperature of the lever element made of a memory element cools down below the permissible temperature set value. The brush support arms then immediately resume their previous position and permit resumption of power supplied to the commutator.

FIG. 2 shows a variation of the design of FIG. 1 in which the lever element 3 made of a memory element with two-way effect is designed as a separate part of each brush support arm, to which a spring element 31 supporting the brush 7 at its lower free end is separately fastened. FIG. 2 also depicts the position by the broken line into which the brush support arm in the event of attaining or exceeding the temperature set value is instantaneously moved by the lever element made of a memory element, thereby simultaneously separating the power supply from commutator 1.

In FIG. 3 a further embodiment with a tubular brush holder system, is shown with the tube 10 fastened to a brush support plate 14, wherein a brush 8 is conducted and pressed against the surface of a commutator 1 by a brush pressure spring 11 bearing on its upper end. On the right side brush 8 is equipped with an impressed tooth grid 81 in such a fashion that a lever element 4 made of a memory element with two-way effect instantaneously moves the brush when attaining or exceeding the temperature set value by a torsional-swivel deflector from the position shown with the continuous lines into the position shown with the broken line, thereby mating with a corresponding tooth mesh 41 in the teeth of the tooth grid of brush 8; thereby, the brush is slightly lifted into the position shown in broken line, contrary to the pressure exerted by the brush pressure spring 11, so that the power supply between brush 8 and commutator 1 is again interrupted.

FIG. 4 shows another embodiment with a tubular brush holder system in accordance with the invention. This embodiment has the tubular brush holder system fastened to a brush support plate 15. In this case, when exceeding the temperature set value, the brush 9 aligned in tube 12 is lifted by the lever element 5 fastened to the end of the exterior wall of the tube facing the commutator 1 by a stretch-bend deflector at its other free end from the surface of the commutator; the total lever element, for that purpose, is initially bent away from the exterior wall of the tube above its fastening point at the exterior wall of the tube 12 in an area A in which it demonstrates marked memory characteristics and thereupon bent back in an area B characterized primarily by spring characteristics with its free end pressed against the external wall of tube 12 so that is free end when attaining or exceeding the temperature set value, due to the recoil of the lever element in area B, is pressed against brush 9, thereby lifting brush 9 from the surface of commutator 1 by a force component which acts against the spring power exerted by the brush pressure spring 13. For better mating of the end of the lever element pressing against brush 9 this end, in a fashion similar to the embodiment in accordance with FIG. 4, is designed with a ratched-like tooth grid 91, preferably impressed, at least in the area of the free mating end. As is also seen in FIG. 4, tube 12 has an opening in the mating area of the free end of the lever element through which the free end of the lever element during a recoil motion of the lever element can pass in the event of excessive heatup of the commutator motor. If a memory element with a two-way effect is incorporated, then the free end of the lever element which lifts brush 9 from the surface of commutator 1, is retracted from the tooth grid 91 after the heatup to the temeperature set value recedes, and brush 9 is released so that it can once again be pressed down by the brush pressure spring 13 onto the surface of commutator 1, thereby releasing the power supply to the motor.

It will now be understood that there has been disclosed an improved thermal overload protection apparatus for electrical machines utilizing memory effect alloy elements. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. In an electrical motor having brushes and a plurality of rotating electrical contacts, a thermal overload protection apparatus, with a thermally actuated switching mechanism, whereby when the temperature of the protection apparatus exceeds a set value, the power supplied from the brushes to the rotating contacts can be interrupted; comprising a lever element, manufactured from a memory element, providing the thermally actuated switching by lifting the brushes from the rotating electrical contacts of the motor whenever the overload temperature set value is exceeded.

2. A themal overload protection apparatus according to claim 1, wherein the rotating electrical contacts comprise a commutator of a motor.

3. A thermal overload protection apparatus according to claim 1, wherein the rotating electrical contacts comprise sliprings of a motor.

4. A thermal overload protection apparatus according to claim 2, wherein the memory element is a two-way effect memory element.

5. A thermal overload protection apparatus according to claim 3, wherein the memory element is a two-way effect memory element.

6. A thermal overload protection apparatus according to claim 2, wherein the brushes are part of a hammer brush holder system, further comprising:
    said lever element comprising a brush support arm, made with the memory element, having one end, which is fixedly mounted to a brush support plate;

a spring element connected to the lever element; and a brush, connected to the spring element, which is held at a free end against the motor commutator.

7. A thermal overload protection apparatus according to claim 3, wherein the brushes are part of a hammer brush holder system, further comprising:

said lever element comprising a brush support arm, made with the memory element, having one end, which is fixedly mounted to a brush support plate;

a spring element connected to the lever element; and a brush, connected to the spring element, which is held at a free end against the motor commutator.

8. A thermal overload protection apparatus according to claim 2, wherein the brushes are part of a hammer brush holder system, further comprising:

said lever element comprising a single-unit brush support arm, made with the memory element, having one end, which is fixedly mounted to a brush support plate;

a spring element portion connected to the lever element; and a brush portion, connected to the spring element, which is held at a free end against the motor commutator.

9. A thermal overload protection apparatus according to claim 3, wherein the brushes are part of a hammer brush holder system, further comprising:

said lever element comprising a single-unit brush support arm, made with the memory element, having one end, which is fixedly mounted to a brush support plate;

a spring element portion connected to the lever element; and a brush portion, connected to the spring element, which is held at a free end against one of the motor sliprings.

10. A thermal overload protection apparatus according to claim 2, wherein the brushes are part of a hammer brush holder system, further comprising a brush support arm, made of a memory element, forming an end of the support arm, which is fixedly mounted in a brush support plate, shaped as a lever element, with the remaining portion of the brush support arm being comprised of an elastic spring element attached to the memory element, which presses the brush held at its free end against the surface of the commutator.

11. A thermal overload protection apparatus according to claim 3, wherein the brushes are part of a hammer brush holder system, further comprising a brush support arm, made of a memory element, forming an end of the support arm, which is fixedly mounted in a brush support plate, shaped as a lever element, with the remaining portion of the brush support arm being comprised of an elastic spring element attached to the memory element, which presses the brush held at its free end against the surface of one of the sliprings.

12. A thermal overload protection apparatus according to claim 1, wherein the brushes are aligned within a tube of a tubular brush holder system, essentially radial to the rotating electrical contacts, and pressed by a spring against the surface thereof, further comprising: one end of the lever element is attached to an exterior wall of the brush holder; a second end of the lever element being unattached and bent onto one of the brushes in such a manner that when the set value of the temperature is exceeded the unattached end exerts a force on one of the brushes in excess of the force exerted in the opposite direction by the brush spring thereby lifting the brush from the surface of the rotating electrical contacts.

13. A thermal overload protection apparatus according to claim 12, wherein the rotating electrical contacts comprise a commutator.

14. A thermal overload protection apparatus according to claim 13, further comprising: a plurality of gear tooth protrusions along one side of each of the brushes; and a torsional-swivel deflector, connected to the second end of the lever element, which exerts the lifting force against the brush spring when the set-value temperature is exceeded by engaging the gear tooth protrusions in a gear meshing manner.

15. A thermal overload protection apparatus according to claim 13, further comprising: a plurality of ratchet-like gear tooth protrusions along one side of each of the brushes; and the second end of the lever element is bent into a stretch-bend deflector, which exerts the lifting force against the brush spring, when the set-value temperature is exceeded, by directly engaging one of the ratchet-like gear tooth protrusions.

* * * * *